US011919041B2

(12) United States Patent
Seiringer et al.

(10) Patent No.: US 11,919,041 B2
(45) Date of Patent: Mar. 5, 2024

(54) DEVICE AND METHOD FOR CLASSIFYING A MATERIALS MIXTURE

(71) Applicant: IFE Aufbereitungstechnik GmbH, Waidhofen an der Ybbs (AT)

(72) Inventors: Hubert Seiringer, Wieselburg (AT); Markus Steinberger, Wieselburg (AT)

(73) Assignee: IFE Aufbereitungstechnik GmbH, Waidhofen an der Ybbs (AT)

( * ) Notice: Subject to any disclaimer, the term of this patent is extended or adjusted under 35 U.S.C. 154(b) by 0 days.

(21) Appl. No.: 17/807,140

(22) Filed: Jun. 16, 2022

(65) Prior Publication Data

US 2022/0305528 A1 Sep. 29, 2022

Related U.S. Application Data

(63) Continuation of application No. PCT/EP2020/025587, filed on Dec. 17, 2020.

(30) Foreign Application Priority Data

Dec. 20, 2019 (DE) ..................... 10 2019 008 916.2
Dec. 20, 2019 (DE) ..................... 20 2019 005 280.1

(51) Int. Cl.
*B07B 11/04* (2006.01)
*B07B 4/02* (2006.01)
*B07B 11/06* (2006.01)

(52) U.S. Cl.
CPC .............. *B07B 4/025* (2013.01); *B07B 11/04* (2013.01); *B07B 11/06* (2013.01)

(58) Field of Classification Search
CPC ......... B07B 4/025; B07B 11/04; B07B 11/06; B07B 4/02; B07B 9/02
See application file for complete search history.

(56) References Cited

U.S. PATENT DOCUMENTS 3,834,561 A * 9/1974 Crow ........................ B03B 7/00 241/24.2
3,854,585 A * 12/1974 Herkes ...................... B07B 9/02 209/34

(Continued)

FOREIGN PATENT DOCUMENTS

DE 26 53 205 A1 6/1977
DE 102005008210 A1 * 8/2006 .............. B07B 4/00

(Continued)

*Primary Examiner* — Patrick H MacKey
(74) *Attorney, Agent, or Firm* — Orbit IP

(57) ABSTRACT

A device for classifying a material mixture of multiple materials has a first transport unit into which the material mixture to be classified is deposited by a supply device. A second transport unit is arranged downstream. A first chute is provided between the first and second transport, via which a first material with a first fluid resistance can be separated from the material mixture. At least one third transport unit is arranged downstream of the second transport unit, such that a transit route for the materials is formed between the second and third transport units. A second chute is provided between the second and third transport units, via which at least the second material with a second fluid resistance can be separated from the material mixture. The third transport unit is designed so that material can pass through and/or a fluid flow can pass through.

12 Claims, 5 Drawing Sheets

(56) References Cited

U.S. PATENT DOCUMENTS

| | | | | | |
|---|---|---|---|---|---|
| 4,466,542 | A | | 8/1984 | Oetiker et al. | |
| 4,974,334 | A | * | 12/1990 | Roddewig | B01J 8/40<br>34/368 |
| 5,394,893 | A | * | 3/1995 | Coleman | B07B 9/02<br>131/109.2 |
| 9,050,629 | B2 | * | 6/2015 | Thielepape | B07B 4/02 |
| 9,199,280 | B2 | * | 12/2015 | Viny | B07B 4/04 |
| 10,343,189 | B2 | * | 7/2019 | Garabedian | B07B 9/02 |
| 2006/0180522 | A1 | * | 8/2006 | Legtenberg | B07B 4/02<br>209/640 |
| 2008/0105597 | A1 | | 5/2008 | Miller et al. | |
| 2014/0102955 | A1 | | 4/2014 | Viny | |

FOREIGN PATENT DOCUMENTS

| | | | |
|---|---|---|---|
| DE | 10 2005 008210 | B4 | 8/2009 |
| EP | 0 159 050 | A1 | 10/1985 |
| FR | 2 329 363 | A1 | 5/1977 |
| WO | 2018/222519 | A1 | 12/2018 |

* cited by examiner

DEVICE AND METHOD FOR CLASSIFYING A MATERIALS MIXTURE

CROSS-REFERENCE TO RELATED APPLICATIONS

This continuation application claims priority to PCT/EP2020/025587 filed on Dec. 17, 2020 which has published as WO 2021/121664 A1 and also the German application number 10 2019 008 916.2 filed on Dec. 20, 2019 and application number 20 2019 005 280.1 filed on Dec. 20, 2019, the entire contents of which are fully incorporated herein with these references.

DESCRIPTION

Field of the Invention

The invention relates to a device for classifying a materials mixture comprising several materials or groups of materials, the device having a first transport unit, to which the materials mixture to be classified can be fed by a feed device, and a second transport unit, which is, in the transport direction of the materials mixture, arranged downstream and at a distance from the first transport unit, with a first chute being provided between the first transport unit and the second transport unit, via which a first material or a first group of materials with a first fluid resistance can be separated from the materials mixture, a use of this device as well as a method for classifying such a materials mixture, in which the materials mixture is transported from a first transport unit to a second transport unit being arranged, in a transport direction of the materials mixture, downstream and spaced from the first transport unit, and the first material or the first group of materials with a first fluid resistance is discharged through a first chute located between the first and the second transport unit and the remaining portion of the materials mixture is transferred to the second transport unit.

Background of the Invention

A cleaning machine for granular material is known from EP 0 392 455 A1, which is based on an air screening principle: A feed material flow is interspersed with an air flow, with the feed material flow being divided into two fractions. A first fraction containing the heavier parts falls downwardly and can then be further processed. A second fraction containing the lighter parts is carried on by the airflow. For this purpose, a feed chute is provided which is arranged above a grate and is loaded with the material to be cleaned. The grate is formed by aerodynamically profiled lamellae that are spaced apart and extend over the entire width of the machine. The feed chute opens into a screening chamber containing the grate and delimited at the top by a flow baffle, in which the separation of the first and second fraction of the feed material flow takes place. The bottom of the screening chamber is funnel-shaped and has a downwardly open window, through which the first fraction is discharged downwards. The second fraction is discharged via a window arranged diagonally opposite the grate in the area of the wall of the screening chamber opposite the feed chute. The screening area is adjoined by an expansion space accessible via the window, the funnel-shaped bottom of which is equipped with a discharge gate. In the expansion space, the second fraction is separated into two partial currents, with the first partial current being formed by the heavier particles of the second fraction. This partial current is discharged by said discharge gate. The light parts of the second fraction form the second partial current of the second fraction. These are entrained by the air exiting from the expansion space via a further window opposite the aforesaid window. The further window is followed by an inflow nozzle of a centrifugal separator which extends over the same width as the grate and, accordingly, as the screening chamber and the expansion chamber, which is arranged with a horizontal axis, by means of which the impurities remaining in the air flow can be separated. The air sucked in by a fan and cleaned in the centrifugal separator is returned to the grate below the feed chute. For this purpose, a supply chute running in the area of the ventus side wall on the fan connects to a pressure connection of the fan and leads to a distribution box arranged in the area of the ventus front side and extending over the same width as the associated grate.

CH 677327 A5 discloses a method and a device for separating a mixture of substances and an application of the method. This document describes a separation process and a corresponding device, in which, in addition to dynamic forces, in particular the surface pressure between the bodies to be sorted and an inwardly yielding drum is used. This separation process is based on the fact that surface pressure-specific heavy bodies sink into the interior of the drum and are ejected at a lower point than surface pressure-specific light parts that are rejected by the surface of the drum and are removed separately. The mixture of substances to be separated is transferred directly into a sorting drum via a feeding device. This is driven by a shaft to which bristles are fastened, which are brought into a cylindrical shape by their tubular shape or the centrifugal force acting in the process. With regard to the surface pressure, heavy parts such as glass bottles sink into the interior of the drum and light parts such as aluminum cans and plastic bottles are immediately rejected when they hit the sorting drum. These light parts fall onto a light material discharge belt and are transported away. The larger parts are carried along by the bristles and guided to a heavy material discharge belt located under the drum. The air flow generated by the drum is used to lift light parts such as paper and plastic parts from the drum and at the same time these lightest parts are sucked off via an aspiration system.

DE 195 01 263 C2 discloses a method and a device for classifying a materials mixture consisting of at least two materials or at least two groups of materials. The device comprises a first blower unit for generating a fluid current and a transport unit, which is arranged under the blower unit, and by means of which the materials mixture can be transported from the blower unit to a drop section. The drop section is acted upon by a further fluid current penetrating the materials mixture, the further fluid flow being generated by a second blower unit. It is provided that a dissipation unit is arranged between the first blower unit and the second blower unit, which dissipates the first air current flowing into it, this dissipation unit being designed as a duct unit and the first fluid current being able to flow out of a duct of the duct unit. The result of this is that the first fluid current is at least partially weakened after it has passed through the materials mixture, in that it is at least partially dissipated by the dissipation unit before it reaches the second fluid current. The known method provides that the materials mixture is introduced into a first fluid current generated by a suction fan, so that at least a defined portion of the material or group of materials with a lower fluid resistance is spatially separated from the remaining portion of the materials mixture, and wherein the materials mixture classified in this way is conveyed by a transport unit running under the blower unit to a drop section, with this drop section being acted upon by a further fluid current penetrating the materials mixture. In this way a combined pressure-suction process is created, which is particularly suitable for wind sifting of recycling material in waste management.

DE 10 2005 008 210 B4 discloses a device for classifying a materials mixture consisting of at least two materials or at least two groups of materials, and such a method, in which the device comprises a suction fan unit for generating a fluid current and a first transport device arranged under the suction fan unit, through which the materials mixture can be transported from the suction fan unit to a drop section. The drop section is acted upon by a further fluid current which penetrates the materials mixture, this further fluid current being generated by the suction fan unit arranged above the first transport unit. It is also essential that the device has a shielding, through which the fluid supply from outside the drop section to the suction fan unit, which generates the further fluid current, is diminished or at least reduced.

An air screening device is known from EP 2 366 461 B1, which has a first conveying element which feeds a waste mixture to a screening drum, with this waste mixture being applied to the outside of the screening drum. A blowing device is arranged between the first conveyor element and the screening drum, the air flow of which is directed from below against the region of the screening drum on which the waste mixture impinges. The direction of rotation of the screening drum corresponds to the blowing direction of the air flow at the region where the air flow hits the circumference of the screening drum. A distribution device is provided between the first conveyor element and the screening drum, which has at least one horizontally arranged, rotary-driven plate, the distribution device being designed in such a way that it distributes the portions of the waste mixture arriving from the first conveyor element over a greater width than these portions occupy on the first conveyor. The waste mixture distributed in this way is distributed to a second conveyor element and transferred to the screening drum. The distance between the aforementioned second conveyor element and the screening drum and its rotating speed are adjusted to the waste material in such a way that the waste mixture hits the screening drum in the upper quadrant of the side facing the second conveyor element, i.e., on that portion of the drum circumference of the screening drum that lies between its uppermost point, its zenith, and the most distant point towards to the second conveyor element, i.e., its equator. According to one embodiment of the device described in the aforementioned document, a belt which is designed as a conveyor belt rests on the surface of the screening drum, so that the screening drum forms a deflection drum of this conveyor belt. In this way, the lighter components of the waste mixture that have reached the zenith of the screening drum can also be transported away to a point that is comparatively far away from the screening drum. In order to avoid this undesirable effect occurring at the device described in the aforementioned document, it is proposed that an impact element is introduced into the flight path of the waste mixture, which is designed as an impact curtain or impact roller or as a guide plate, which, in each case, deflects the waste fractions hitting the impact element and leads them to the aforementioned peripheral portion of the screening drum.

EP 2 486 986 B1 discloses a distribution device for an air screener which can be arranged between a first conveyor element, which carries a waste mixture, and a downstream device, to which the waste mixture is to be fed. The distribution device has at least one horizontally arranged, rotary-driven turn table and is designed in such a way that it distributes the fractions of the waste mix arriving from the first conveyor element over a greater width than they occupy on the first conveyor element. The distribution device has two horizontally arranged, counter-rotating turn tables, which distribute incident portions of the waste mixture in a conveying direction of a first wind conveying element forwards and laterally outwards, the turn tables being arranged at different heights and a first turn table extends partially over the second turn table and the turn tables are each trough-shaped concave.

All of the aforementioned devices and methods for air screening of a materials mixture allow the separation of a materials mixture into two groups, namely a heavier first group of materials and a lighter second group of materials, which contains, after the above-described screening, the remainder of the materials mixture, i.e., that portion which was not previously separated by the action of gravity by means of the known device from the materials mixture. However, there is an increasing need, particularly in waste management, to separate a materials mixture into more than two different groups of materials.

SUMMARY OF THE INVENTION

It is therefore the object of the present invention to further develop a device and a method of the type mentioned at the beginning in such a way that a materials mixture can be divided into at least three groups of materials in a simple manner.

To solve this problem, the device according to the invention provides that the device has at least one third transport unit arranged downstream of the second transport unit in the transport direction of the materials mixture being arranged at a distance from it, so that a passage is provided between the second transport unit and the third transport unit for the materials or materials mixtures, and that a chute is provided between the second transport unit and a third transport unit, through which at least the second material or the second materials group with a second fluid resistance is separable from the materials mixture, and that the third transport unit is permeable to material and/or permeable to a fluid current.

The method according to the invention provides that at least one further material or one further group of materials is classified through a second chute arranged in the transport direction downstream of the second transport unit.

The measures according to the invention advantageously create a device for classifying a materials mixture, which is characterized by a simple structure and efficient operation. As it is now provided according to the invention that the device according to the invention has at least one third transport unit following the second transport unit in the transport direction of the materials mixture, with a passage for the materials or groups of material of the materials mixture between the second transport unit and the third transport unit is formed, which was not previously discharged through the first chute, and furthermore that a second chute is provided, through which at least the second material or the second group of materials can be separated from the materials mixture, and that the third transport unit is permeable to material and/or permeable to a fluid current, an efficient separation of the materials mixture is achieved.

According to an advantageous further development of the invention, it is provided that a transport device for the fourth material or the fourth group of materials is provided above the third transport unit, which preferably has at least one transport channel, through which a third fluid current, which is created by a suction fan, is flowing. In this way, an efficient suction of the fourth material or the fourth group of materials is advantageously achieved.

A further advantageous development of the invention, which is of an independent significance, is that in the device according to the invention it is provided that the aforementioned third fluid current flows through the third transport unit and through the passage between the second and the third transport unit. Such a measure has the advantage that not only the fourth material or the fourth group of materials lying on the third transport unit can be transported away by the removal device, but that the fourth material or the fourth group of materials can already be taken away by the third fluid current running through the passage during its journey from the second to the third transport unit.

Such a measure is particularly advantageous if, according to a further advantageous further development of the invention, which in turn has an independent significance, it is provided that the passage between the second and the third transport unit is impacted by a fluid current flowing through the second chute and thus the passage, which is introduced into the second chute against the effect of gravity. Such a measure has the advantage that the fourth material or the fourth group of materials, which is more strongly influenced by a fluid current than the other materials, differs from the other materials with regard to its trajectory, i.e., the trajectory of the pieces of the fourth material or the fourth group of materials is higher than that of the other materials, so that the fourth material or the fourth group of materials then comes to rest on the third transport unit above the other materials and can therefore be transported away more easily.

A further advantageous further development of the invention provides that the distance between the first transport unit and/or the second transport unit and the subsequent transport unit can be varied and/or the inclination can be varied in the device. Such a measure has the advantage that the positioning of one transport unit in relation to the other transport unit, in connection with an appropriate selection of the transport speed of this transport unit, the dropping behavior of the transport unit in question can be easily adjusted.

A further advantageous development of the invention provides that the device has a dissipation device for the first fluid current having an openable and closable flap, and that when the flap is at least partially open, a fluid current running through the flap can be generated by a suction fan of the removal device. Such a measure has the advantage that the suction fan of the removal device can already suck off the fourth material at the end of the second transport unit.

Further advantageous further developments of the invention are the subject of the dependent claims.

BRIEF DESCRIPTION OF THE DRAWINGS

Further details and advantages of the invention can be found in the exemplary embodiments, which are described below with reference to the drawings. These show.

DETAILED DESCRIPTION OF THE PREFERRED EMBODIMENTS

Figure 1:
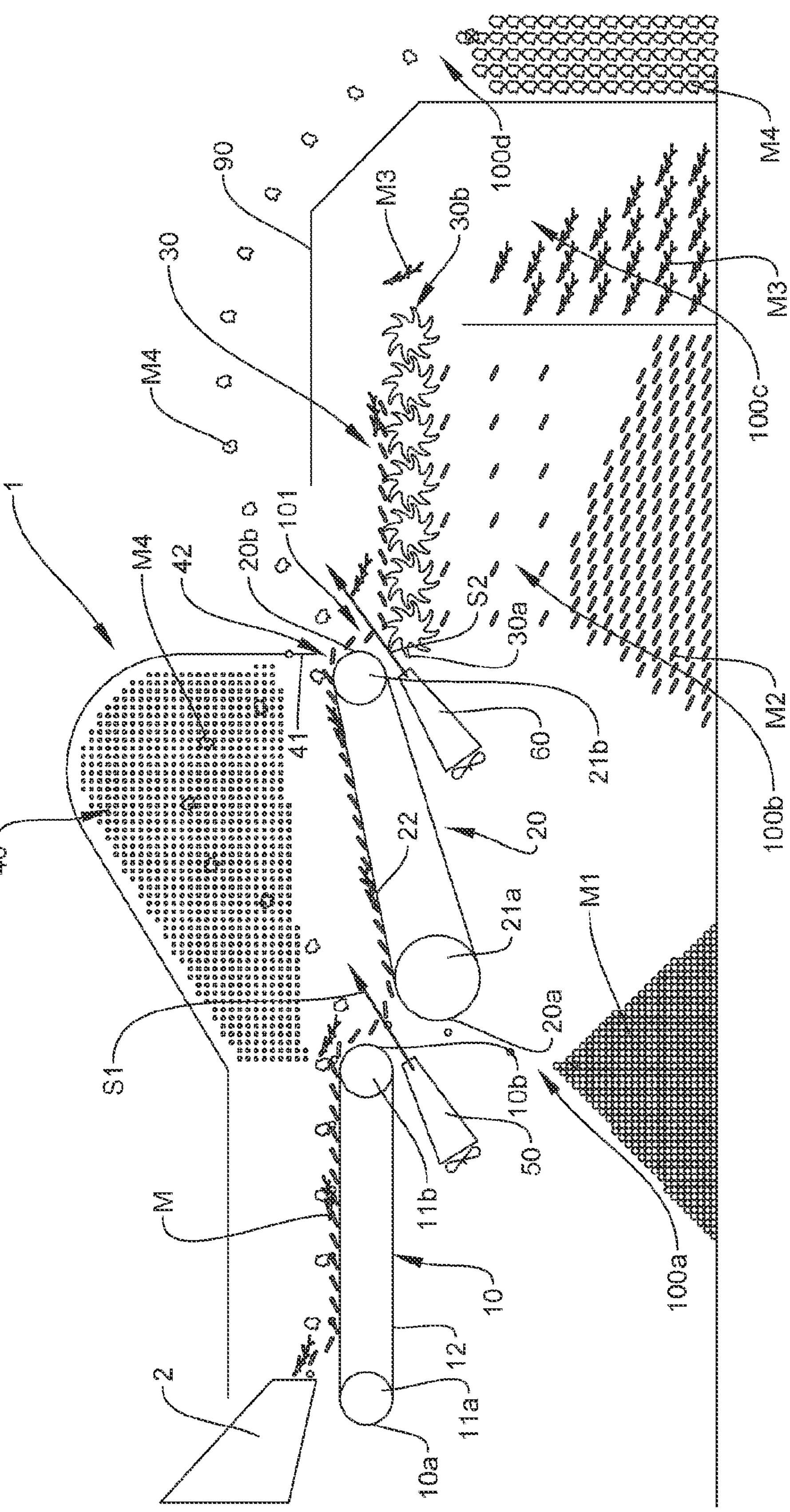
FIG. 1 shows a first exemplary embodiment of a device for classifying a materials mixture.

FIG. 1 shows a first exemplary embodiment, generally designated by 1, of a device for classifying a materials mixture M. This device basically contains a feed station 2, a first transport unit 10, a second transport unit 20, above which a dissipation device 40 is arranged, and a third transport unit 30. The second transport unit 20 is arranged in the transport direction of the materials mixture M to be classified downstream of the first transport unit 10 and at a distance to it. In a corresponding manner, the third transport unit 30 is arranged in the transport direction of the materials mixture M to be classified downstream of the second transport unit 20 and again spaced apart from it. Each of these transport units 10, 20, 30 moves the materials mixture M lying on it in the transport direction of the device 1, i.e., from left to right in the representations of the figures. A first chute **100*a* with a first drop section is formed between the first transport unit 10 and the second transport unit 20 and a second chute 100*b* with a second drop section is formed between the second transport unit 20 and the third transport unit 30. A first blower unit 50 is provided between the two aforementioned transport units 10 and 20, which generates a fluid current S1, in particular an air current, which is introduced into the first chute 100*a* and from bottom to top, i.e., opposite to the direction of gravity, and flows through the chute 100*a* or at least a portion thereof. In a corresponding manner, a second fan unit 60 is arranged between the second transport unit 20 and the third transport unit 30, which generates a second fluid current S2, in particular an air current, which is introduced into the second chute 100*b* and which flows from below to the top, i.e., against the direction of gravity, through at least a partial area thereof. The mechanical-structural design of the aforementioned components of the device 1 is known, so they do not have to be described in more detail and it is sufficient to show these components only schematically in FIG. 1** and the following figures.

The materials mixture M to be classified by the device 1 contains at least three materials M1, M2 and M3 or at least three groups of materials. In the exemplary embodiment described here, it is provided, as an example, that the materials mixture contains four materials M1, M2, M3 and M4 or four groups of material. From the description below, it is evident to a person skilled in the art that this does not limit the generality of the following considerations. The device 1 described and the method explained with reference to the device 1 can also be used to classify a materials mixture consisting of only three materials or three groups of materials or more than four materials or four groups of materials.

It is assumed that the first material M1 or the first group of materials has a lower first fluid resistance than the second material M2 or the second group of materials, which has a second fluid resistance. The third material M3 or group of materials has a third fluid resistance that is greater than or equal to the second fluid resistance. The fourth material M4 or group of materials has a fourth fluid resistance that is greater than the first three fluid resistances. As an example of such a materials mixture a particularly frequently occurring constellation in the waste management is to be mentioned, in which the first material or the first materials group are, e.g., stones and/or mineral construction residues, the second material or the second group of materials and the third material or the third group of materials are, e.g., wooden parts, wood grain or oversized wood grain, and the fourth material or the fourth group of materials are, e.g., foliage or films, especially plastic films.

It is evident for a person skilled in the art from the following description that the aforementioned materials only have exemplary character and the device in claim 1 as well as the method described with reference to the device for air classifying a materials mixture are not limited to the above materials.

In the sense of a more concise description, in the following it is spoken of only one material M1-M4, although the term "material" should of course also include a "group of materials". For clarification, it should also be stated at this point that "low fluid resistance" means that a certain material is less affected by a fluid current impinging on it than a material with a higher fluid resistance, for example because it is heavier than the material with a higher fluid resistance and/or that it exposes a smaller surface to the fluid current, i.e., is more compact.

The materials mixture M is fed into the device 1 via the feed station 2 and falls from there onto the first transport unit 10. Preferably it is provided that a distribution station (not shown) is arranged in this area, which effects that the materials mixture M falling from the feed station 2 onto the first transport unit 10 is distributed over its width. It is preferably provided that the first transport unit 10 is designed as a revolving conveyor belt with deflection rollers 11*a*, 11*b* and a conveyor belt 12, the first end 10*a* of which faces the feed station 2 and the second end 10*b* of which is adjacent to a first end 20*a* of the second transport unit 20.

The first transport unit 10 moves the materials mixture M located on it in the direction of the second transport unit 20, wherein—as already described above—the first chute 100*a* with the first drop section is provided between the first transport unit 10 and the second transport unit 20. This chute 100*a* is formed in that a free space is provided between the second end 10*b* of the first transport unit 10 and the first end 20*a* of the second transport unit 20 lying adjacent thereto, so that a part of the materials mixture M—here the first material M1—can fall through this space downwards and thus out of the device 1.

The first transport unit 10 serves as an acceleration station for the materials mixture M on it, so that—as described below—the first material M1 with the first fluid resistance falls through the first drop section out of the device 1, while the remaining portion of the materials mixture M to be separated—preferably using the first fluid current S1, as described below—is transported to the second transport unit 20 via the chute 100*a* separating the two transport units 10, 20.

Preferably it is provided that the first transport unit 10 can be arranged in the device 1 in a way that its position can be changed in relation to the second transport unit 20, so that the distance between the second end 10*b* of the first transport unit 10 and the first end 20*a* of the second transport unit 20, and thus the length of the chute 100*a* between the two transport units 10, 20 viewed in the direction of transport of the materials mixture, can be reduced or increased. This is preferably achieved in that the first transport unit 10 is arranged in the device 1 so that it can be displaced in the transport direction of the materials mixture. However, it is also possible that, to change the distance between the two transport units 10, 20, the second transport unit 20 is arranged in a variable position, in particular displaceable, in the device 1, and a combination of the two aforementioned measures is also possible.

Furthermore, it is preferred that the inclination of the first transport unit 10 can also be changed.

By changing the distance between the first transport unit 10 and the second transport unit 20 and/or changing the inclination of the first transport unit 10, in connection with a suitable choice of transport speed of the first transport unit 10, the trajectories of the materials M1-M4 of the materials mixture to be classified can be selected in such a way that the—usually heavier—first material M1 does not reach the second transport unit 20, but drops through the chute 100*a*, while the remaining portion M2-M4 of the materials mixture M, i.e., the second, third and fourth materials M2-M4, are transported to the second transport unit 20.

As shown schematically in FIG. 1, it is preferably provided that the first fluid current S1 generated by the blower unit 50, i.e., usually an air current, is introduced into the first chute 100*a*, which traverses the chute 100*a* between the first and second transport unit 10 and 20 from bottom to top, so that the portion of the materials mixture M above the chute 100*a* is pressurized. The trajectors of the second material M2 and the third and fourth materials M3 and M4 thereby become higher, with the result that the three aforementioned materials M2-M4 are moved to the second transport unit 20, while the first material M1 falls through the chute 100*a* and can be separated from the materials mixture M in this way.

It goes without saying for the person skilled in the art that the transport speed, the inclination and/or the distance between the first transport unit 10 and the second transport unit 20, i.e., the length of the chute 100*a*, is adjusted to the effect of the first fluid current S1 in such a way that the above-described separation of the first material from the remaining part of the materials mixture M to be classified is achieved. In principle, it is possible to carry out this separation only by the first transport unit 10 serving as an acceleration station for the materials mixture. Using the blower unit 50 to generate the first fluid current S1 has the advantage, beyond the above measures and effects, that it also makes it easier to classify through the remaining part of the materials mixture M, as described in detail further below.

In the above description, it was assumed that the first material M1 falls essentially directly from the first transport unit 10 into the first chute 100*a* and the other materials M2-M4 reach the second transport unit 20. However, this requires that the individual materials M1-M4 of the materials mixture M to be classified have been accelerated by the first transport unit 10 serving as an acceleration station for this materials mixture M to such an extent that the first material M1 drops through the chute 100*a* and the other materials M2-M4 reach the second transport unit 20, preferably with the support of the air current S1. This can be done relatively easily if there are large differences in the fluid resistances between the first material M1 and the other materials M2-M4, e.g., when the first material M1 is significantly heavier than the other materials M2-M4, so that they can be accelerated sufficiently to bridge the distance between the end 10*b* of the first transport unit 10 and the beginning of the second transport unit 20. However, the differences between the first material M1 and the further materials M2-M4 are often not so great that the separation described above can be achieved to a sufficient extent. It is therefore often necessary to accelerate the materials M1 and M2-M4 more strongly, with the result that a more or less large portion of the first material M1 does not fall directly into the chute 100*a*, but rather impacts the first end 20*a* of the second transport unit 20. It is therefore preferred that the first end 20*a* of the second transport unit 20 is designed as a kind of impact unit for the first material M1, which causes the first material M1 hitting the front area of the second transport unit 20 to be guided to the first drop chute 100*a*.

The second transport unit 20 is in turn preferably designed as a conveyor belt, which has two deflection rollers 21*a*, 21*b* and a circulating transport belt 22. It is preferably provided that the conveyor belt 22 is made of a resilient material. This also has the advantage, that pieces of the first material M1 that hit the upper quadrant of the deflection roller 21*a* facing the first transport unit 10 bounce off this deflection roller 21*a* due to the resilient properties of the transport belt 22 further than it would be the case if these pieces of material would hit a hard surface. The conveyor belt 22 running over the first deflection roller 21*a* thus serves as the impact element mentioned in the previous paragraph for the first material M1.

In the aforementioned configuration of the second transport unit 20 as a circulating conveyor belt, it is preferred that the trajectory of the second and the third material or the second and third groups of materials is selected in such a way that these material particles move over the zenith of the deflection roller 21*a*.

As it can be seen from FIG. 1, it is preferred that the first deflection roller 21*a* facing the first transport unit 10 is larger than the second deflection roller 21*b*; it therefore has a larger impact surface for the first material M1, and consequently forms a larger impact element.

The second transport unit 20 now transports the portion of the materials mixture M remaining after the aforementioned separation step in the direction of the third transport unit 30. In the simplest configuration of the device 1, the separation of the second material M2 from the other materials M3 and M4 of the materials mixture M is again carried out as described above, namely that the materials mixture M lying on the second transport unit 20 is accelerated in such a way that the second material M2—corresponding to the first material M1—falls through the second chute 100*b*, while the third and the fourth material M3 and M4 overcome the second chute 100*b* and finally reach via a passage 101 between the second and the third transport unit 20 and 30 this third transport unit 30. The statements made regarding the design and function and effect of the first transport unit 10, the second transport unit 20 and/or the first blower unit 50, in particular with regard to the positioning, the change in the inclination of the second transport unit 20 and/or the selection of the transport speed, apply here accordingly. Again, it is in principle possible that—as in the case of the separation of the first material M1—the second fan unit 60 and thus the second fluid current S2 are omitted. However, the use of a second fluid current S2 also has the advantages described below here as well.

With the assumption described above—the simplest embodiment of device 1—the materials M3 and M4 are then transported further by the third transport unit 30 and then drop at the end 30*b* into a third chute 100*c*. The device 1 in its simplest configuration described above thus allows the separation of a materials mixture M containing three materials M1-M3.

However, FIG. 1 shows a more complex configuration of the device 1, which is described below: As can be seen from the aforementioned figure, the device 1 is designed in such a way that the second chute 100*b* and thus the second drop section are not between the second and the third transport unit 20 and 30, but it is provided that the second chute 100*b* and thus the second drop section runs through the third transport unit 30, i.e., that the second material M2 falls through the third transport unit 30 and the third material M3 is transported forward by the third transport unit 30 and falls at the end 30*b* into the third chute 100*c*. This can preferably be achieved in that the third transport unit 30 is designed as a screen in such a way that this screen is permeable for the second material M2 but not for the third material M3. The third transport unit 30 can preferably be designed as a star screen or a disc screen.

The configuration of the device 1 described above thus allows a materials mixture M consisting of three materials M1-M3 to be classified in a simple manner. As already mentioned at the beginning, it is assumed that the materials mixture M to be classified not only has got three, but four materials M1-M4. In order to be able to also classify material M4, i.e., to be able to classify the materials mixture M3 and M4 that remains on the third transport unit 30 after the second material M2 has been separated, it is preferably provided that the fourth material M4, when passing through the passage 101, is acted upon by the second fluid current S2 generated by the second blower unit 60 in such a way that this material M4 is entrained by the second fluid current S2 and transported to a fourth chute 100*d*. It is preferably provided that a separating element 90 is provided between the third chute 100*c* and the fourth chute 100*d*, which, if not preventing, then at least reduces a dropping of the fourth material M4 into the third chute 100*c* and thus a mixing of the materials M3 and M4.

Figure 2:
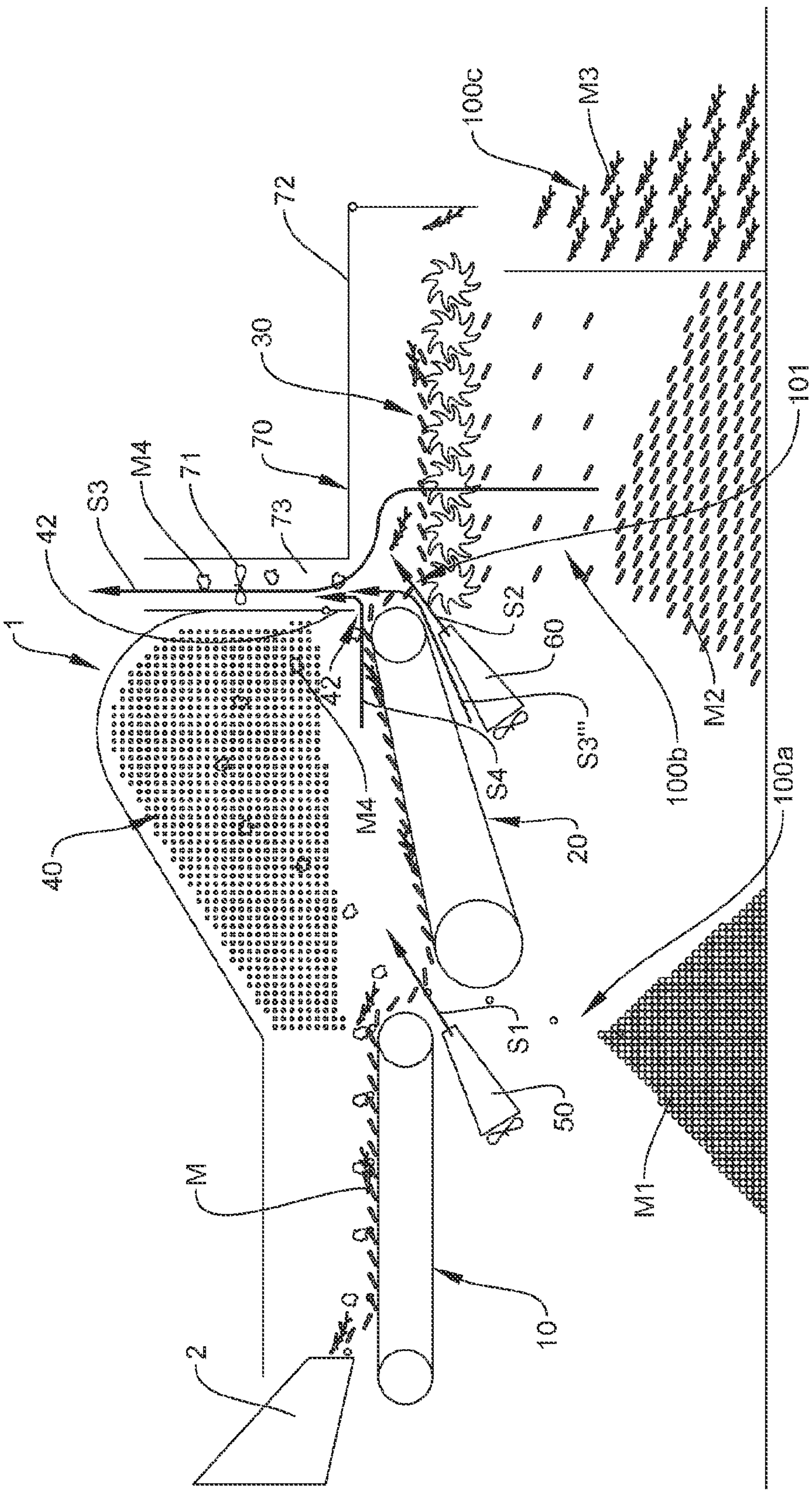
FIG. 2 shows a second exemplary embodiment of a device for classifying a materials mixture.

FIG. 2 shows a second exemplary embodiment of the device 1, the basic structure of which corresponds to that of the first exemplary embodiment, so that the corresponding components are no longer described in detail with regard to their design, arrangement, function and effect. The essential difference between the first and second exemplary embodiment is that for separating the fourth material M4 a removal device 70 is arranged above the third transport unit 30, which serves to remove the material M4 located on the surface of the third transport unit 30. In the exemplary embodiment described here, the removal device 70 is designed as a suction device which has a suction fan 71, shown only schematically in FIG. 2, which generates a suction current S3. In the case described here, the transport device 70 has a cover 72 which is arranged over the third transport unit 30 and serves to prevent or at least reduce the inflow of ambient air, so that the material M4 located on the third transport unit 30 can be sucked in by the removal device 70 and removed from the device 1 in this way. The suction is therefore carried out by the negative pressure generated by the suction fan 71 on the transport unit 30.

It was described above that it is preferred that the third transport unit 30 is permeable for the second material M2, i. e. for the second material M2 to fall through this material-permeable third transport unit 30 into the second chute 100*b*. In the second exemplary embodiment, it is preferred that the transport device 70 is designed in such a way that the third fluid current S3 runs through the third transport unit 30 and preferably—as fluid flow S'''—through the passage 101, this means that the suction fan 71 of the removal device 70 sucks in the fluid current S3 through the third transport unit 30 and preferably through the passage 101. This causes the material M4 lying on the third transport unit 30 and the material M4 passing through the passage 101 to be entrained by this third fluid current S3 and transported away in this way. In the second exemplary embodiment, the third transport unit 30 is both material-permeable and fluid-flow-permeable, i.e., generally air-permeable.

However, the design of the third transport unit 30 as permeable to material, as described above, as it is the case in particular with a star screen or a disk screen, is not absolutely necessary. For a large number of application purposes, it may be sufficient for the third transport unit 30, as described above, to only be permeable to a fluid flow, that is, as a rule, to be permeable to air. This is particularly advantageous when the materials mixture M to be separated contains only materials M1, M2 and M3 as well as M4, with the fourth material M4 being sucked off by the removal device 70 as described above. The second and the third material M2 and M3 are then transferred from the second end 30*b* of the third transport unit 30 to the third chute 100*c* then corresponding in its function to second chute 100*b*.

In the above situation, the use of the second blower unit 60 and the second fluid current S2 generated by it is advantageous: If the materials mixture, i.e., a mixture of the materials M2-M4, falling from the second end 20*b* of the second transport unit 20 to the first end 30*a* of the third transport unit 30 through the passage 101, is acted upon by the second fluid current S2, this has the effect that in particular the trajectory of the particles of the fourth material M4, i.e., that material which is mostly affected by an impact of a fluid current, is higher than the trajectories of materials M2 and M3. The consequence of this is that the fourth material M4 lies on the materials M2 and M3 on the third transport unit 30 and can therefore be sucked off more easily by the removal device 70.

As already explained above, in the first and second exemplary embodiment, a dissipation device 40 is preferably arranged above the second transport unit 20, which serves to dissipate the first fluid current S1 generated by the first blower unit 50, so that it does not reach or reaches the removal device 70 at least only weakly. This has the advantage that the suction fan 71 of the removal device 70 generally only has to suck off the third fluid current S3, S3' flowing through the third transport unit 30 and possibly the fluid current S''' flowing through the passage 101, which is—as described above—used to transport off the fourth material M4. The first fluid current S1, which does not contribute to this, therefore does not have to be removed by the removal device 70. This is advantageous for reasons of an efficient operation of the removal device 70. It is therefore preferred that the device 1 is structurally designed in such a way that the first fluid current S1 reaches the third transport unit 30 as little as possible, with the result that it does not have to be removed from it. As already mentioned above, in particular the dissipation device 40 serves for that purpose. However, it is also possible that guide devices are provided in the device 1 instead of or in addition to this, which weaken or divert the first fluid current S1 before it reaches the transport device 70.

For the aforementioned reason, it is advantageous that between the second transport unit 20 and the rear end 40*b* of the dissipation device 40 in the conveying direction, there is only a small free space that acts as a transport gap 42, through which the materials M2, M3 and M4 can be moved out of the dissipation device 40. In order to make it possible that larger pieces of the materials M2-M4 are not impeded in their removal, it is preferably provided that the dissipation device 40 has a movable flap 41 at its end 40*b*, which swings out when larger pieces of the materials M2-M4 pass. The flap 41 returns to its initial position after such a passage and closes—as described above—the transport gap 42 between the dissipation device 40 and the second transport unit 20 again in an appropriate degree.

According to a preferred embodiment of the dissipation device 40, it is provided that the flap 41 can be adjusted, in particular opened and closed in a controlled manner. Since—as described above—the lighter material M4 has a higher trajectory, it lies at the end of the dissipation device 40 on the materials M2 and M3, so it is not covered by these materials and can therefore be efficiently sucked off by means of a suction current S4 generated by a suction fan 71 or 71*a* of the removal device 70. Since it is now provided that the flap 41 is selectively adjusted, the suction fan 71 or 71*a* of the removal device 70 can already suck off this fourth material M4 by means of the fluid flow S4 at the end of the second transport unit 20. Preferably it is provided that the flap 41 is constructed in such a way that the opening of the transport gap 42 can be variably adjusted, the flow behavior of the materials M2-M4 and in particular of the fourth material M4 can be influenced in an advantageous manner.

It is then preferred that—as shown in the figures—the front end 70*a* of the removal device 70 in the direction of transport is arranged above the second end 20*b* of the second transport unit 20, i.e., that in particular a suction channel 73, 73*a* is arranged above the passage 101 between the second and the third transport unit 20 and 30.

The person skilled in the art can see from the above description that the dissipation device 40 is therefore not required if—as also already explained—according to a non-preferred configuration of the device 1, the use of a first fluid current S1 and thus the first blower unit 50 is dispensed with or the fluid current S1 is designed in such a way that it does not or only insignificantly affect the way in which the removal device 70 works. In this case, preferably the second transport unit 20 is omitted either, rather it can be provided that the first chute 100*a* is formed between the first and the third transport unit 10 and 30, i.e., that the materials M2-M4 are transported by the first transport unit 10 are transferred to the third transport unit 30 as described above and the material M1 falls through the chute 100*a*.

As also already mentioned above, the use of the first fluid stream S1 not only has the advantage that this enables the materials M2-M4 of the materials mixture M to be transferred from the first to the second transport unit 10 and 20 or from the first transport unit 10 to the third transport unit 30 (if the dissipation device 40 is dispensed with), is made more efficient. Just as described above for the second fluid current S2, impacting the materials mixture M by the first fluid current S1 also causes the individual materials M1-M4 to have different trajectories due to their mutual different fluid resistances. The material M1 is affected the least by the fluid current S1, so it drops through the first chute 100*a*. The material M4 is most strongly influenced by the fluid current S1, the trajectory of the pieces of the material M4 is therefore generally higher, as indicated in FIGS. 1 and 2 in that in the region of the dissipation device 40 pieces of the fourth material M4 are shown. The consequence of this is that the pieces of material M4 on the second transport unit 20 lie on the materials M2 and M3, so that the material M4 can be sucked off more easily. Preferably, a dissipation unit 40 is used, as is described in the applicant's DE 195 01 263 C2.

Figure 3:
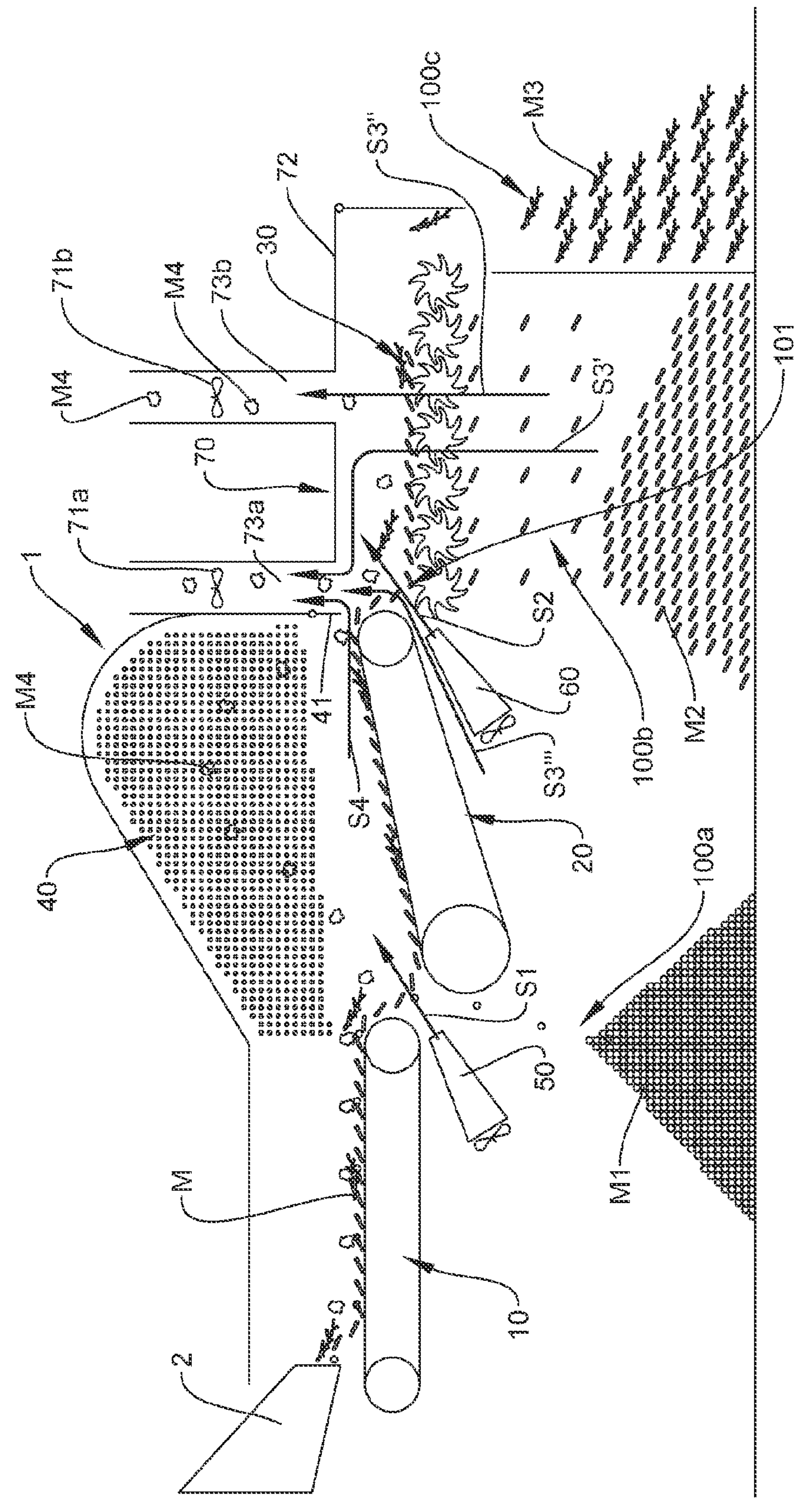
FIG. 3 shows a third exemplary embodiment of a device for classifying a materials mixture.

FIG. 3 shows a third exemplary embodiment of a device 1, the basic structure of which corresponds to that of the second exemplary embodiment, so that corresponding components are provided with the same reference symbols and their configuration, function and/or effect are not explained in any more detail. The main difference between the first and second exemplary embodiment is that the removal device 70 now has two transport channels 73*a* and 73*b*, with a suction fan 71*a*, 71*b* being arranged in each of these transport channels 73*a*, 73*b*.

The suction fans 71*a* and 71*b* generate fluid currents S3' and S3", which suck the fourth material M4 from the surface of the third transport unit 30. At least the first of the fluid currents S3' and S3" runs through the third transport unit 30 and—as fluid current S3'" preferably through the passage 101, as it was described in the second and third exemplary embodiments.

The offset arrangement of two removal channels 73*a* and 73*b* in the direction of transport has the advantage that this improves the suction of the fourth material M4, since the suction is no longer limited to an area in which the fourth material M4 is still impacted by the second fluid current S2 and is therefore floating, but also is sucked into the second removal channel 73*b* by the fluid current S3' generated by the suction fan 71*a*.

Figure 4:
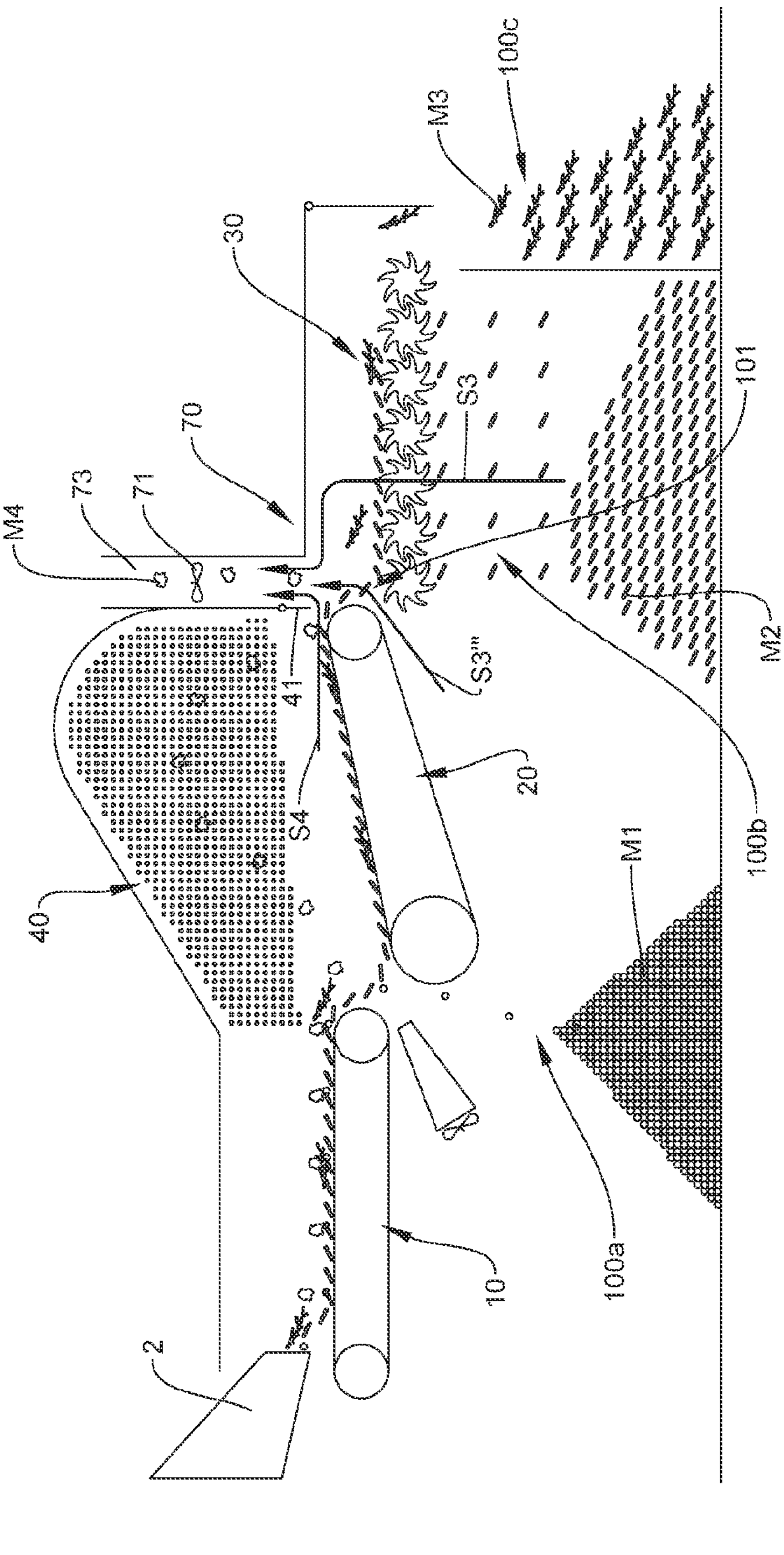
FIG. 4 shows a fourth exemplary embodiment of a device for classifying a materials mixture.
Figure 5:
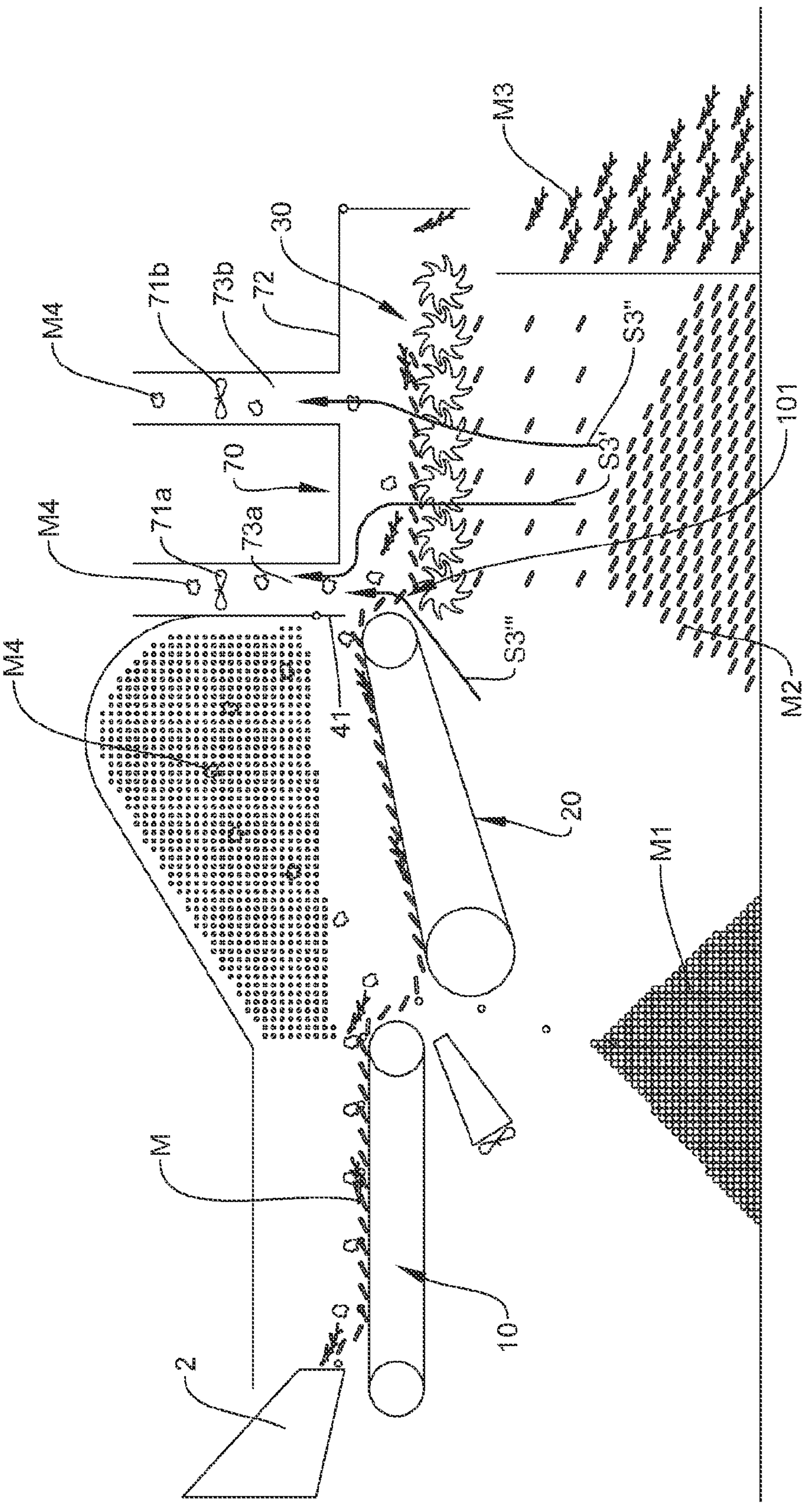
FIG. 5 shows a fifth embodiment of a device for classifying a materials mixture.

A fourth and fifth embodiment are shown in FIGS. 4 and 5, with the basic structure of the fourth and fifth embodiment corresponding to that of the second and third embodiment, so that components which correspond to one another are given the same reference numbers and their design, design, function and effect are no longer described in detail. The main difference between the corresponding exemplary embodiments is that—as already outlined in the description of the first and second exemplary embodiment—the second blower unit 60 is dispensed with in the fourth and fifth exemplary embodiment.

In summary, it can be stated that the device 1 described is characterized in that the separation of a materials mixture M consisting of at least three materials M1-M4 is made possible in a simple and efficient manner.

What is claimed is:

1. A device for classifying a materials mixture consisting of several materials or groups of materials, the device comprising:

a first transport unit to which the materials mixture can be fed by a feed device;

a second transport unit, which is arranged downstream in a transport direction of the materials mixture and at a distance from the first transport unit;

a first chute being provided between the first transport unit and the second transport unit, via which a first material or a first group of materials with a first fluid resistance can be separated from the materials mixture;

at least one third transport unit being arranged downstream in the transport direction of the materials mixture from the second transport unit;

wherein between the second transport unit and the third transport unit a passage for the materials or groups of materials is formed;

a second chute downstream of the second transport unit, through which at least the second material or the second group of materials having a second fluid resistance can be separated from the materials mixture, wherein the second chute is arranged between the second transport unit and the third transport unit or runs through the third transport unit and that the third transport unit is material-permeable and/or permeable for a further fluid current; and a dissipation device arranged above the second transport unit, by which a first fluid current can be dissipated.

2. The device according to claim 1, wherein the dissipation device comprises an adjustable flap.

3. The device according to claim 1, wherein a removal device for a fourth material or a fourth group of materials having a fourth fluid resistance is arranged above the third transport unit.

4. The device according to claim 3, wherein the removal device for the fourth material or the fourth group of materials has at least one removal channel, through which the further fluid current flows, and that the further fluid current is a suction fluid current generated by at least one suction fan arranged above the third transport unit.

5. The device according to claim 1, wherein the further fluid current flows through the third transport unit and through the passage between the second and third transport unit.

6. The device according to claim 1, wherein at least one blower unit is provided between the first transport unit and the second transport unit and/or the third transport unit, through which the first fluid current and/or a second fluid current can be generated, and that the first fluid current and/or the second fluid current is led into the first chute and/or into the second chute against the effect of gravity.

7. The device according to claim 1, wherein downstream of the third transport unit a third chute is provided, through which at least one further material or at least one further group of materials can be separated from the remaining materials mixture.

8. The device according to claim 1, wherein the first transport unit and/or the second transport unit are arranged in the device variably and/or inclination variably in terms of the transport unit being arranged downstream thereof.

9. The device according to claim 1, wherein the dissipation device comprises a flap, wherein when the flap of the dissipation device is at least partially open, the further fluid current running through the flap is configured to be generated by the at least one suction fan of the removal device.

10. A device for classifying a materials mixture consisting of several materials or groups of materials, the device comprising:

a first transport unit to which the materials mixture can be fed by a feed device;

a second transport unit, which is arranged downstream in a transport direction of the materials mixture and at a distance from the first transport unit;

a first chute being provided between the first transport unit and the second transport unit, via which a first material or a first group of materials with a first fluid resistance can be separated from the materials mixture;

at least one third transport unit being arranged downstream in the transport direction of the materials mixture from the second transport unit;

wherein between the second transport unit and the third transport unit a passage for the materials or groups of materials is formed;

a second chute downstream of the second transport unit, through which at least the second material or the second group of materials having a second fluid resistance can be separated from the materials mixture, wherein the second chute is arranged between the second transport unit and the third transport unit or runs through the third transport unit and that the third transport unit is material-permeable and/or permeable for a further fluid current; and a dissipation device, by which a first fluid current can be dissipated, and that the dissipation device comprises an adjustable flap configured to be open and closeable.

11. A method for classifying a materials mixture comprising several materials or material groups, the method comprising the steps of:

providing a device, in which the materials mixture is to be classified, having a first transport unit and a second transport unit being arranged in a transport direction of the materials mixture downstream of and at a distance to the first transport unit;

transporting the materials mixture from the first transport unit to the second transport unit;

removing the first material or the first group of materials with a first fluid resistance in a first chute being arranged between the first and the second transport unit;

feeding a remaining portion of the materials mixture to the second transport unit;

classifying at least one further material or at least one further group of materials in a second chute being arranged in the transport direction downstream of the second transport unit;

dropping at least a second material or the second group of materials having a second fluid resistance from the third transport unit or through the third transport unit out of the device;

providing a dissipation device arranged above the second transport unit; and dissipating a first fluid current by the dissipation device.

12. The method of claim 11, including the step of generating a further fluid current when a flap of the dissipation device is at least partially open.

* * * * *